United States Patent
Maruyama et al.

(10) Patent No.: US 12,282,621 B2
(45) Date of Patent: Apr. 22, 2025

(54) TOUCH PANEL SYSTEM AND DISPLAY DEVICE

(71) Applicant: Sharp Display Technology Corporation, Kameyama (JP)

(72) Inventors: Takenori Maruyama, Kameyama (JP);
Shinji Yamagishi, Kameyama (JP);
Takuma Yamamoto, Kameyama (JP);
Kazutoshi Kida, Kameyama (JP);
Yasuhiro Sugita, Kameyama (JP);
Hiroshi Fukushima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/414,625

(22) Filed: Jan. 17, 2024

(65) Prior Publication Data
US 2024/0272737 A1    Aug. 15, 2024

(30) Foreign Application Priority Data
Feb. 15, 2023   (JP) .................. 2023-021712

(51) Int. Cl.
*G06F 3/041*    (2006.01)
*G06F 3/044*    (2006.01)

(52) U.S. Cl.
CPC .......... *G06F 3/0416* (2013.01); *G06F 3/0446* (2019.05); *G06F 2203/04105* (2013.01)

(58) Field of Classification Search
CPC ............... G06F 3/0416; G06F 3/0446; G06F 2203/04105; G06F 3/041; G06F 3/04166
See application file for complete search history.

(56) References Cited

U.S. PATENT DOCUMENTS

| | | | |
|---|---|---|---|
| 9,619,068 | B2 | 4/2017 | Kim et al. |
| 2014/0292699 | A1 | 10/2014 | Ando |

(Continued)

FOREIGN PATENT DOCUMENTS

| | | |
|---|---|---|
| JP | 2014-179035 A | 9/2014 |
| JP | 2017-049659 A | 3/2017 |

(Continued)

OTHER PUBLICATIONS

Non-Final Rejection of U.S. Appl. No. 17/477,477 issued on Sep. 13, 2022.

(Continued)

*Primary Examiner* — Jonathan A Boyd
(74) *Attorney, Agent, or Firm* — ScienBiziP, P.C.

(57) ABSTRACT

A touch panel system includes a touch panel including a drive electrode, a position detection electrode, and a pressure detection electrode, and a controller configured to impart a drive signal to the drive electrode and acquire a signal value from each of the position detection electrode and the pressure detection electrode. The controller is configured to detect a touch range by a pointer based on the signal value obtained from the position detection electrode, determine a pressure detection range corresponding to the touch range, of the signal value obtained from the pressure detection electrode, and calculate a magnitude of a pressure by the pointer based on the signal value in the pressure detection range.

5 Claims, 16 Drawing Sheets

(56) References Cited

U.S. PATENT DOCUMENTS

| | | | |
|---|---|---|---|
| 2015/0116233 A1* | 4/2015 | Kono | G06F 3/041 |
| | | | 345/173 |
| 2015/0212633 A1 | 7/2015 | Yamagishi et al. | |
| 2016/0291729 A1 | 10/2016 | Schardt et al. | |
| 2016/0357331 A1 | 12/2016 | Kano et al. | |
| 2017/0052074 A1 | 2/2017 | Watazu et al. | |
| 2017/0068368 A1 | 3/2017 | Hsiao et al. | |
| 2017/0115768 A1 | 4/2017 | Shih et al. | |
| 2018/0067601 A1 | 3/2018 | Winokur et al. | |
| 2019/0102030 A1 | 4/2019 | Oki et al. | |
| 2019/0339313 A1 | 11/2019 | Vandermeijden | |
| 2020/0133455 A1 | 4/2020 | Sepehr et al. | |
| 2021/0141488 A1 | 5/2021 | Mugiraneza et al. | |
| 2022/0129114 A1 | 4/2022 | Yamagishi et al. | |
| 2022/0155901 A1 | 5/2022 | Osawa et al. | |
| 2022/0164060 A1 | 5/2022 | Yamamoto et al. | |
| 2022/0342540 A1 | 10/2022 | Maruyama et al. | |
| 2023/0012281 A1* | 1/2023 | Yang | G06F 3/0418 |

FOREIGN PATENT DOCUMENTS

| | | |
|---|---|---|
| JP | 2022-071284 A | 5/2022 |
| JP | 2022-166512 A | 11/2022 |

OTHER PUBLICATIONS

Non-Final Rejection of U.S. Appl. No. 17/722,155 issued on Dec. 13, 2022.

Notice of Allowance of U.S. Appl. No. 17/722,155 issued on Mar. 29, 2023.

\* cited by examiner

TOUCH PANEL SYSTEM AND DISPLAY DEVICE

CROSS-REFERENCE TO RELATED APPLICATIONS

This application claims the benefit of priority to Japanese Patent Application Number 2023-021712 filed on Feb. 15, 2023. The entire contents of the above-identified application are hereby incorporated by reference.

BACKGROUND

Technical Field

The disclosure relates to a touch panel system and a display device.

JP 2022-71284 A discloses a touch panel system that detects a position touched by a pointer and a pressure applied by the pointer. Specifically, J P 2022-71284 A discloses a touch panel system that includes a touch panel including a drive electrode, a position detection electrode, and a pressure detection electrode, and a controller that imparts a drive signal to the drive electrode and acquires signal values from each of the position detection electrode and the pressure detection electrode. The controller detects the position of the pointer based on the signal values obtained from the position detection electrode, and calculates a magnitude of a pressure applied by the pointer based on signal values within a pressure detection range corresponding to the detected position of the pointer, among the signal values obtained from the pressure detection electrode.

SUMMARY

In a touch panel system that detects a pressure as well as a position, the performance of the touch panel system is influenced by a contact area by a pointer on a touch panel. For example, depending on a position of a key to be touched by a user, the user may stretch his/her finger to touch the key. In this case, the area touched by the user becomes large. When the touched area is large, the pressure on the touch panel is dispersed to a greater extent than when the touched area is small. The inventors have newly found that the magnitude of the pressure can be detected with a higher degree of accuracy by taking into account the size of the contact area by the pointer on the touch panel. Hereinafter, a novel touch panel system and a novel display device based on this finding will be disclosed.

According to an embodiment, a touch panel system includes a touch panel including a drive electrode, a position detection electrode, and a pressure detection electrode, and a controller configured to impart a drive signal to the drive electrode, and acquire a signal value from each of the position detection electrode and the pressure detection electrode. The controller is configured to perform detecting, based on the signal value obtained from the position detection electrode, a touch range by a pointer, determining a pressure detection range corresponding to the touch range, of the signal value obtained from the pressure detection electrode, and calculating, based on the signal value in the pressure detection range, a magnitude of a pressure applied by the pointer.

Further details will be described below as embodiments.

BRIEF DESCRIPTION OF DRAWINGS

The disclosure will be described with reference to the accompanying drawings, wherein like numbers reference like elements.

FIGS. 8A and 8B are diagrams for describing the contact area of the pointer and signal values from the affected electrodes.

DESCRIPTION OF EMBODIMENTS

Touch Panel System

Figure 1:
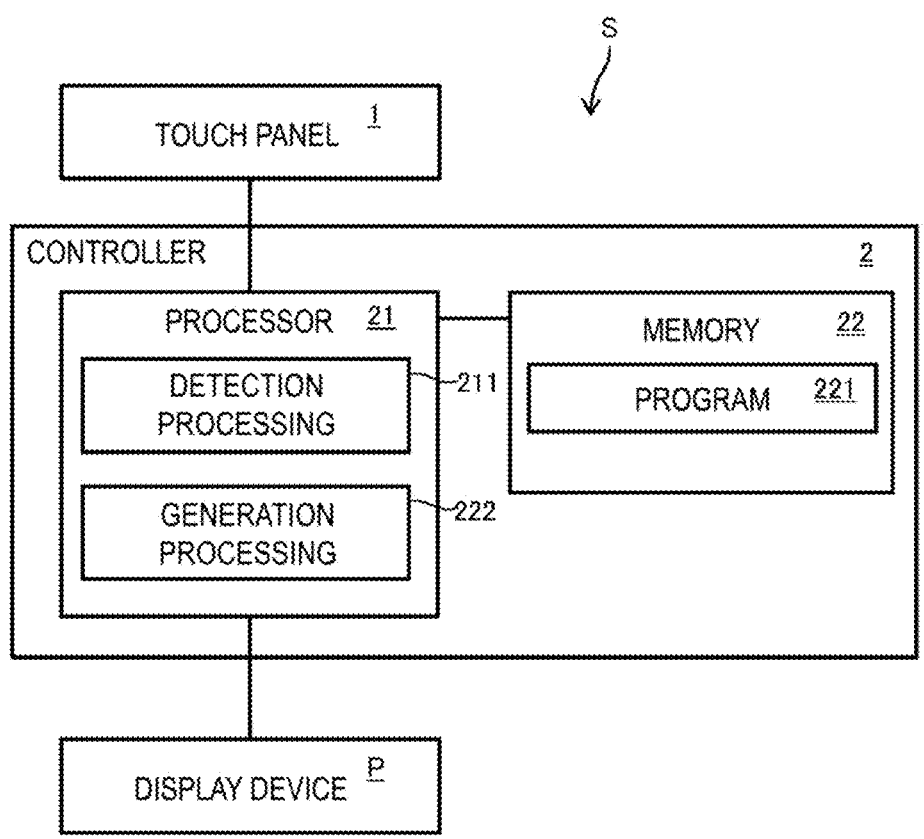
FIG. 1 is a diagram schematically illustrating a configuration of a touch panel system according to an embodiment.

FIG. 1 is a diagram schematically illustrating a configuration of a touch panel system S according to a present embodiment. The touch panel system S includes a touch panel 1 and a controller 2.

Figure 2:
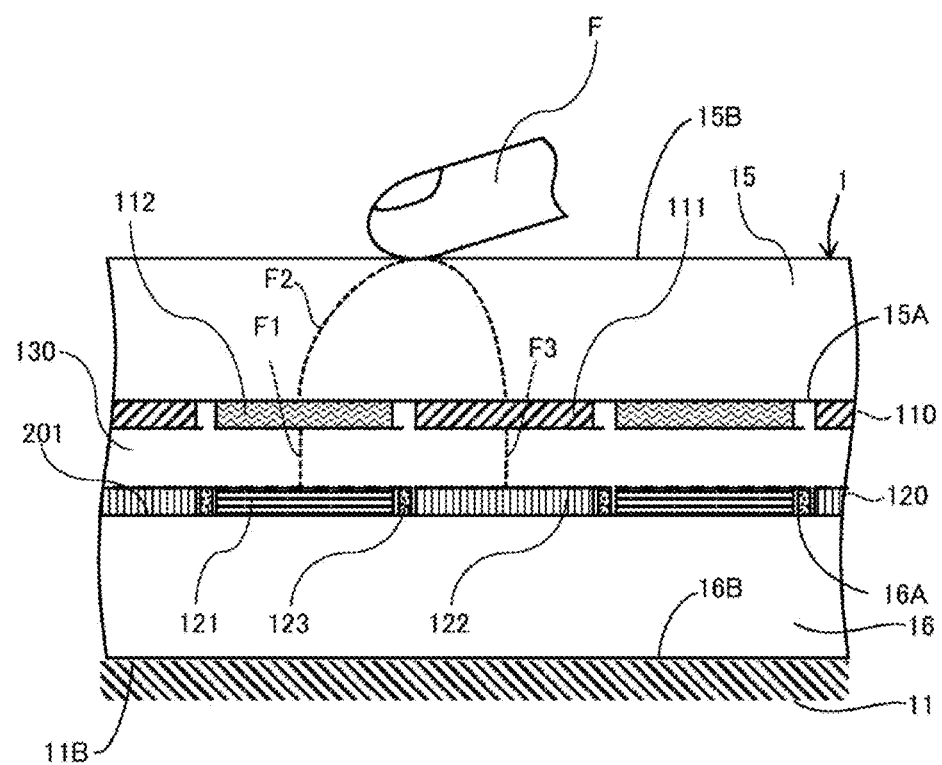
FIG. 2 is a cross-sectional view schematically illustrating an example of a touch panel provided at the touch panel system.
Figure 3:
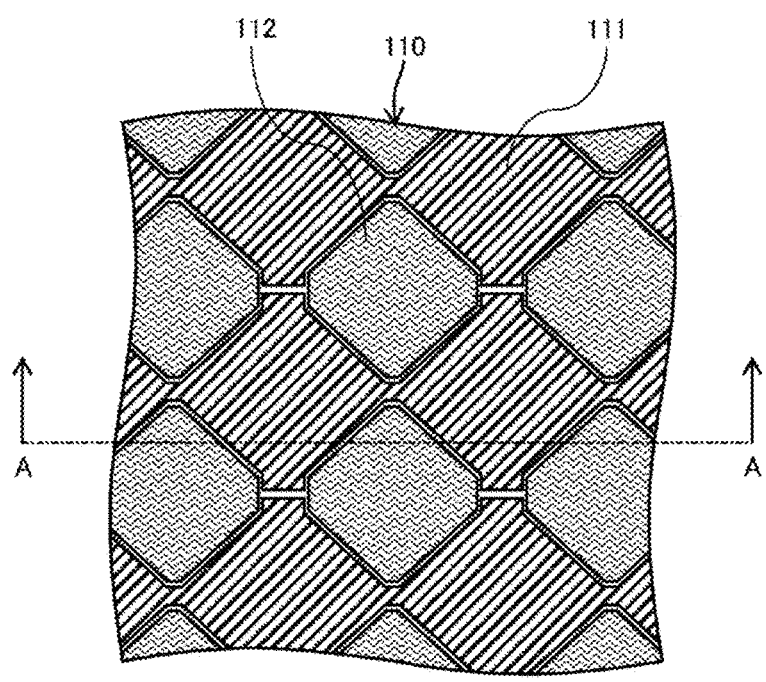
FIG. 3 is a plan view schematically illustrating a configuration of a first electrode layer of the touch panel.
Figure 4:
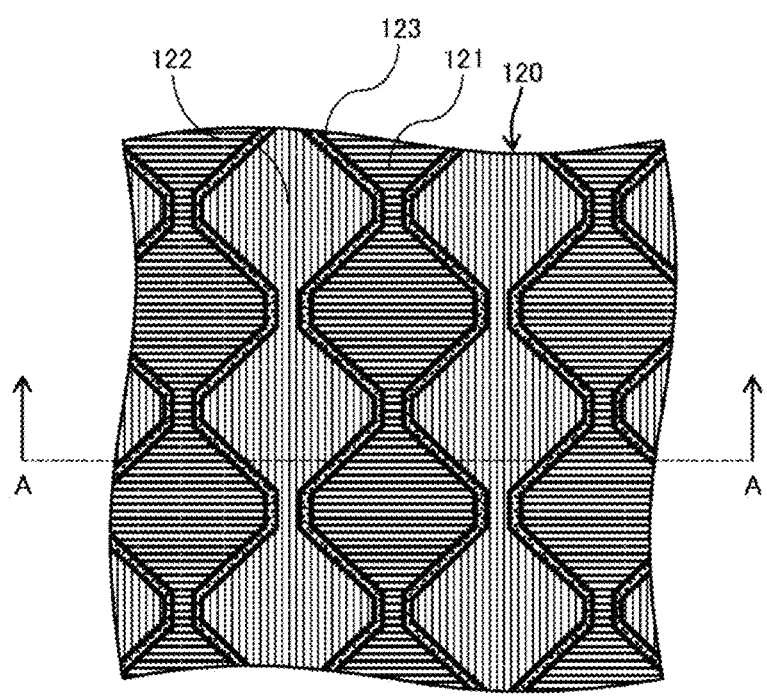
FIG. 4 is a plan view schematically illustrating a configuration of a second electrode layer of the touch panel.

The touch panel 1 includes a drive electrode 111, a position detection electrode 121, and a pressure detection electrode 122 (FIGS. 2 to 4). The controller 2 imparts a drive signal to the drive electrode 111, and acquires signals from each of the position detection electrode 121 and the pressure detection electrode 122. The controller 2 generates output data including at least the magnitude of a pressure applied by a pointer, based on the acquired signals. In a display device P including the touch panel system S, the output data is used, for example, for controlling an image displayed on the display device P.

The touch panel 1 is, for example, a capacitive touch panel. FIG. 2 is a cross-sectional view schematically illustrating an example of the touch panel 1. The touch panel 1 includes a first electrode layer 110 and a second electrode layer 120, which are sandwiched between a first substrate 15 and a second substrate 16, both of which are dielectrics. The first electrode layer 110 and the second electrode layer 120 are layered with a dielectric layer 130 interposed therebetween.

The first electrode layer 110 includes the drive electrode 111 and a floating island electrode 112. The second electrode layer 120 includes the position detection electrode 121 and the pressure detection electrode 122.

A shield electrode 123 is disposed between the position detection electrode 121 and the pressure detection electrode 122. Thus, the position detection electrode 121 and the pressure detection electrode 122 are separated by the shield electrode 123.

For example, the first substrate 15 and the second substrate 16 are formed of a dielectric transparent material such as glass or a polyethylene terephthalate (PET) film. The drive electrode 111, the floating island electrode 112, the position detection electrode 121, and the pressure detection electrode 122 are formed of a conductive transparent material such as indium tin oxide (ITO). The dielectric layer 130 is formed of a dielectric transparent material having elasticity such as a polymer material, an optical clear adhesive (OCA), or an optical clear resin (OCR).

The first substrate 15 and the second substrate 16 are disposed such that a first surface 15A of the first substrate 15 and a first surface 16A of the second substrate 16 face each other. The drive electrode 111 is formed at the first surface 15A of the first substrate 15. The floating island electrode 112 is in a floating state and is formed at the first surface 15A of the first substrate 15. The position detection electrode 121 is formed at the first surface 16A of the second substrate 16. The pressure detection electrodes 122 is formed at the first surface 16A of the second substrate 16.

The controller 2 imparts the drive signal to the drive electrode 111. The position detection electrode 121 is an electrode for detecting a position of a pointer F. The pressure detection electrode 122 is an electrode for detecting a magnitude of a pressure applied by the pointer F.

A second surface 15B of the first substrate 15 on the opposite side from the first surface 15A serves as a front surface of the touch panel 1. The second surface 15B receives operation accompanied by a contact by the pointer F such as a finger.

FIG. 3 is a plan view schematically illustrating a configuration of the first electrode layer 110. FIG. 4 is a plan view schematically illustrating a configuration of the second electrode layer 120. FIG. 2 is a cross sectional view taken along the line A-A in FIGS. 3 and 4.

The drive electrode 111 has a shape (diamond pattern) in which a plurality of rhombus-shaped electrodes are connected to each other in diagonal directions thereof. Further, the floating island electrode 112 is formed by a plurality of rhombus-shaped electrodes that are not connected to each other. Similarly to the drive electrode 111, the position detection electrode 121 has a diamond pattern in which a plurality of rhombus-shaped electrodes are connected to each other. Further, the pressure detection electrode 122 also has a diamond pattern in which a plurality of rhombus-shaped electrodes are connected to each other. A connecting direction of the rhombus-shaped electrodes in the position detection electrode 121 and a connecting direction of the rhombus-shaped electrodes in the pressure detection electrode 122 are parallel to each other, and the position detection electrode 121 and the pressure detection electrode 122 are alternately disposed with respect to a direction perpendicular to the connecting directions. The connecting direction of the rhombus-shaped electrodes in each of the position detection electrode 121 and the pressure detection electrode 122 is perpendicular to a connecting direction of the rhombus-shaped electrodes in the drive electrode 111.

In a plan view in which the second substrate 16 is viewed from the first substrate 15 (hereinafter, simply referred to as a "plan view"), the drive electrode 111 covers at least a part of the pressure detection electrode 122. In the touch panel 1, one of the rhombus-shaped electrodes constituting the drive electrode 111 includes one of the rhombus-shaped electrodes constituting the pressure detection electrode 122 in the plan view. Similarly, one of the rhombus-shaped electrodes constituting the floating island electrode 112 includes one of the rhombus-shaped electrodes constituting the position detection electrode 121 in the plan view.

A user operation (touch by the pointer F) on the touch panel 1 includes at least one of a contact not accompanied by a pressure and an application of pressure, and the touch panel system S detects both of them. The detection of the contact includes a detection of a contact on the front surface and a detection of a position with which the pointer F comes into contact (operation position). The detection of the pressure includes a detection of a pressure on the front surface, a detection of a pressed position (operation position). The detection of the pressure also includes a detection of a magnitude of the pressure.

As a result of the first electrode layer 110 illustrated in FIG. 3 and the second electrode layer 120 illustrated in FIG. 4 being disposed as described above, the floating island electrode 112 and the position detection electrode 121 are capacitively coupled to each other as indicated by a line of electric force F1. When the pointer F comes into contact with the front surface, as indicated by a line of electric force F2, the drive electrode 111 and the floating island electrode 112 are capacitively coupled to each other. Thus, the drive electrode 111 and the position detection electrode 121 are capacitively coupled to each other via the floating island electrode 112. As a result, the electrostatic capacitance between the drive electrode 111 and the position detection electrode 121 decreases via the pointer F, and this results in a change in a signal detected at the position detection electrode 121. Based on the change in the signal detected at the position detection electrode 121, a contact of the pointer F with the front surface of the touch panel 1 and the operation position are detected.

As a result of the first electrode layer 110 illustrated in FIG. 3 and the second electrode layer 120 illustrated in FIG. 4 being disposed as described above, the drive electrode 111 and the pressure detection electrode 122 are capacitively coupled to each other as indicated by a line of electric force F3. When the first substrate 15 is pressed by the pointer F, a distance between the drive electrode 111 and the pressure detection electrode 122 decreases as a result of the dielectric layer 130 being compressed since the dielectric layer 130 is formed of the elastic material. As a result, the electrostatic capacitance between the drive electrode 111 and the pressure detection electrode 122 increases, and this results in a change in a signal detected at the pressure detection electrode 122. Based on the change in the signal detected at the pressure detection electrode 122, an application of pressure on the front surface of the touch panel 1 by the pointer F, the operation position, and the magnitude of the pressure are detected.

Note that, when the first substrate 15 is pressed by the pointer F and the distance between the drive electrode 111 and the pressure detection electrode 122 decreases, since the drive electrode 111 is closer to the shield electrode 123 than to the position detection electrode 121, the drive electrode 111 is more likely to be capacitively coupled to the shield electrode 123. Thus, the electrostatic capacitance between the drive electrode 111 and the position detection electrode 121 becomes less likely to increase. As a result, due to the presence of the shield electrode 123, the decrease in the electrostatic capacitance between the drive electrode 111 and the position detection electrode 121 becomes less likely to be canceled out by the pointer F.

Further, since the pointer F is closer to the shield electrode 123 than to the pressure detection electrode 122 on a path from the pointer F to the pressure detection electrode 122, the pointer F is likely to be capacitively coupled to the shield electrode 123. Thus, the pointer F is inhibited from being capacitively coupled to each of the drive electrode 111 and the pressure detection electrode 122. As a result, due to the presence of the shield electrode 123, a change in the electrostatic capacitance between the drive electrode 111 and the pressure detection electrode 122 is suppressed.

By including the touch panel 1 illustrated in FIGS. 2 to 4, the controller 2 detects the operation position (touched position) and the magnitude of the pressure by the pointer F using the signals from the position detection electrode 121 and the pressure detection electrode 122.

Display Device

Figure 5:
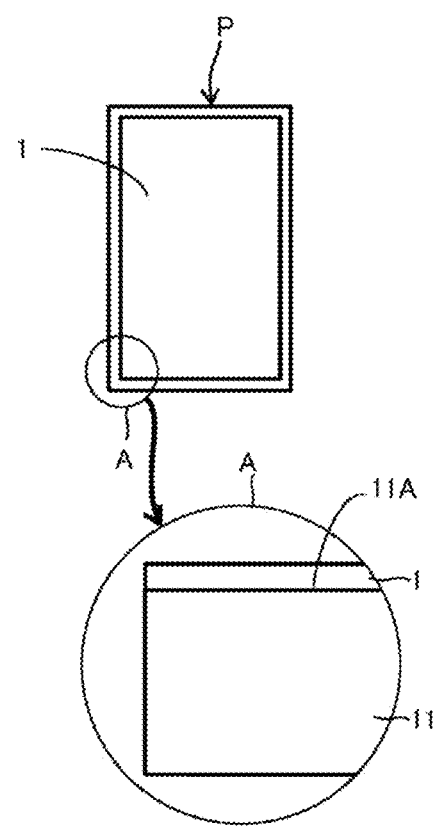
FIG. 5 is a schematic view of a display device according to the embodiment.

The touch panel system S is included in, for example, a display device. FIG. 5 is a schematic view of the display device P according to the present embodiment. The display device P is, for example, a tablet including a display 11 that displays an image on a display surface 11A. The display device P may be a device such as a personal computer or a smartphone as well as the tablet.

A section A of FIG. 5 is a schematic view illustrating a part of a cross section of the display 11 of the display device P. The display 11 is formed of a liquid crystal display or an organic electro luminescence (EL) display, for example. The touch panel 1 is disposed on the display surface 11A of the display 11.

Controller

The controller 2 of the touch panel system S includes a processor 21 and a memory 22. The processor 21 is, for example, a central processing unit (CPU). The memory 22 includes, for example, a read only memory (ROM).

The memory 22 stores a computer program (hereinafter referred to as a program) 221 executed by the processor 21. By executing the program 221, the processor 21 executes processing for generating and outputting output data corresponding to the user operation on the touch panel 1.

The processor 21 executes detection processing 211 by executing the program 221. The detection processing 211 includes detecting the operation position and the magnitude of the pressure by the pointer F based on the signals from the position detection electrode 121 and the pressure detection electrode 122. A flow of the processing will be described below.

The processor 21 executes generation processing 212 by executing the program 221. The generation processing 212 includes generating the output data including at least a pressure value. A method of generating the output data is not limited to a particular method.

Relationship Between Contact Area and Pressure Detection

In the touch panel system S including the touch panel 1 illustrated in FIGS. 2 to 4, it is possible to adopt a method of determining the operation position by the pointer F using the signals from the position detection electrode 121, and calculating the magnitude of the pressure by the pointer F using the signals from the pressure detection electrode 122 in a range defined according to the operation position.

The inventors have found that when the contact area of the pointer F on the touch panel 1 is different, the magnitude of the detected pressure may be different even when the touch panel 1 is pressed with the same force. This point will be described in more detail with reference to FIGS. 6A to 9B.

FIGS. 6A, 6B, 7A, and 7B are diagrams for describing the contact area of the pointer F and a range of affected electrodes. FIGS. 8A, 8B, 9A, and 9B are diagrams for describing the contact area of the pointer F and the signal values from the affected electrodes. In FIGS. 8A, 8B, 9A, and 9B, an X direction represents a direction in which the drive electrodes 111 are aligned, and a Y direction represents a direction in which the position detection electrodes 121 and the pressure detection electrodes 122 are aligned. Examples of input data of the signal values obtained from each of the position detection electrode 121 and the pressure detection electrode 122 are shown in FIGS. 8A, 8B, 9A, and 9B by elements represented by two dimensional coordinates of X and Y. FIGS. 8A, 9A and 8B, 9B illustrate the position detection electrodes 121 and the pressure detection electrodes 122 at the same positions of the touch panel 1, respectively.

Figure 6A:
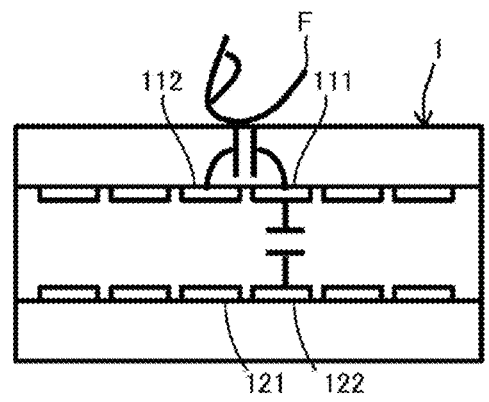
FIGS. 6A and 6B are diagrams for describing a contact area of a pointer and a range of affected electrodes.
Figure 7A:
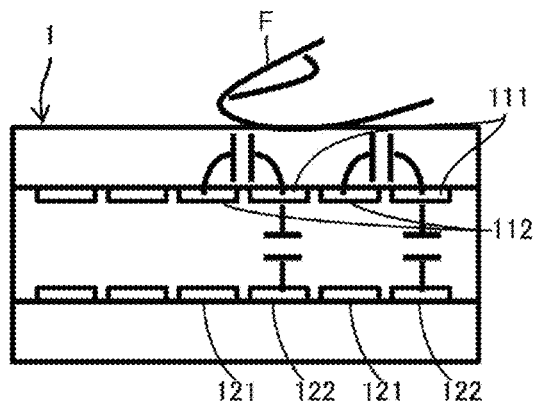
FIGS. 7A and 7B are diagrams for describing the contact area of the pointer and the range of the affected electrodes.

The contact of the pointer F on the touch panel 1 is detected by using the electrostatic capacitance between the drive electrode 111 and the position detection electrode 121 (FIG. 6A and FIG. 7A). At this time, the signal values from the position detection electrodes 121 present in a range affected by the contact increase (FIG. 8A and FIG. 9A).

Figure 6B:
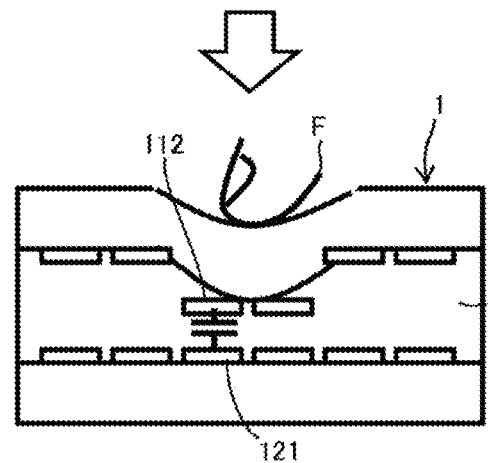
Figure 7B:
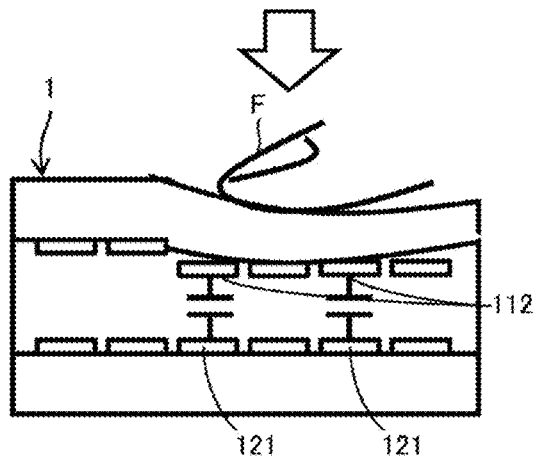

The fact that the pointer F has touched and then pressed the touch panel 1 is detected by using the electrostatic capacitance between the drive electrode 111 and the pressure detection electrode 122 (FIG. 6B and FIG. 7B). At this time, the signal values from the pressure detection electrodes 122 present in the range affected by the pressure increases (FIG. 8B and FIG. 9B).

Figures 8A, 8B:
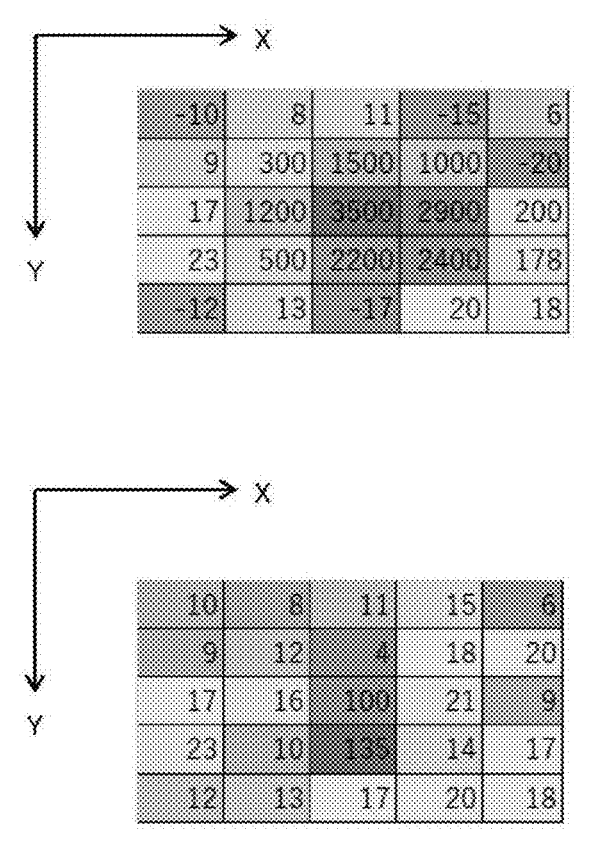
Figure 9A:
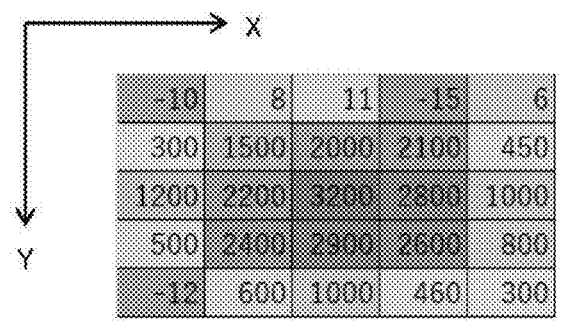
FIGS. 9A and 9B are diagrams for describing the contact area of the pointer and the signal values from the affected electrodes.

When FIG. 8A is compared with FIG. 9A, the smaller the contact area, the smaller the range of the electrodes in which the electrostatic capacitance changes due to the contact. Further, when FIG. 8B is compared with FIG. 9B, the smaller the contact area, the smaller the range of the electrodes in which the electrostatic capacitance changes due to the pressure. Therefore, when FIG. 8B is compared with FIG. 9B, even when the touch panel 1 is pressed with the same force, the smaller the contact area, the larger the signal value since the pressure becomes more concentrated, and the larger the contact area, the smaller the signal value since the pressure becomes more dispersed.

Figure 9B:
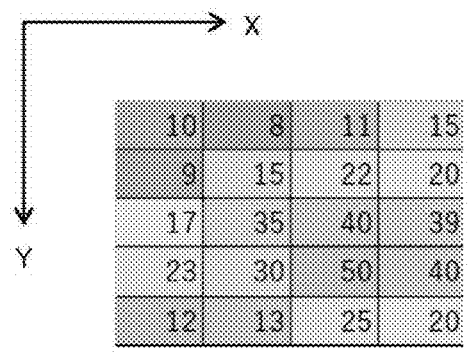

As shown in FIG. 8B and FIG. 9B, a range to be pressed and the signal values change depending on the contact area. Thus, when the magnitude of the pressure by the pointer F is calculated using the signal values from the pressure detection electrodes 122 within the range determined based on the operation position, the magnitude of the pressure may not be accurately obtained depending on the contact area. In other words, when the contact area is small, noise due to the signal values from the pressure detection electrodes 122 in a range with which the pointer F is not in contact may sometimes be mixed in. On the other hand, when the contact area is large, the signal values may be too small, or all the signal values from the pressure detection electrodes 122 in a range with which the pointer F is in contact may not be used to calculate the magnitude of the pressure. With respect to this problem, the inventors have focused on the relationship between the contact area by the pointer F and the range affected by the pressure illustrated in FIGS. 6A, 6B, 7A, and 7B, and have found the following detection methods.

First Embodiment

Detection Method

Figure 10:
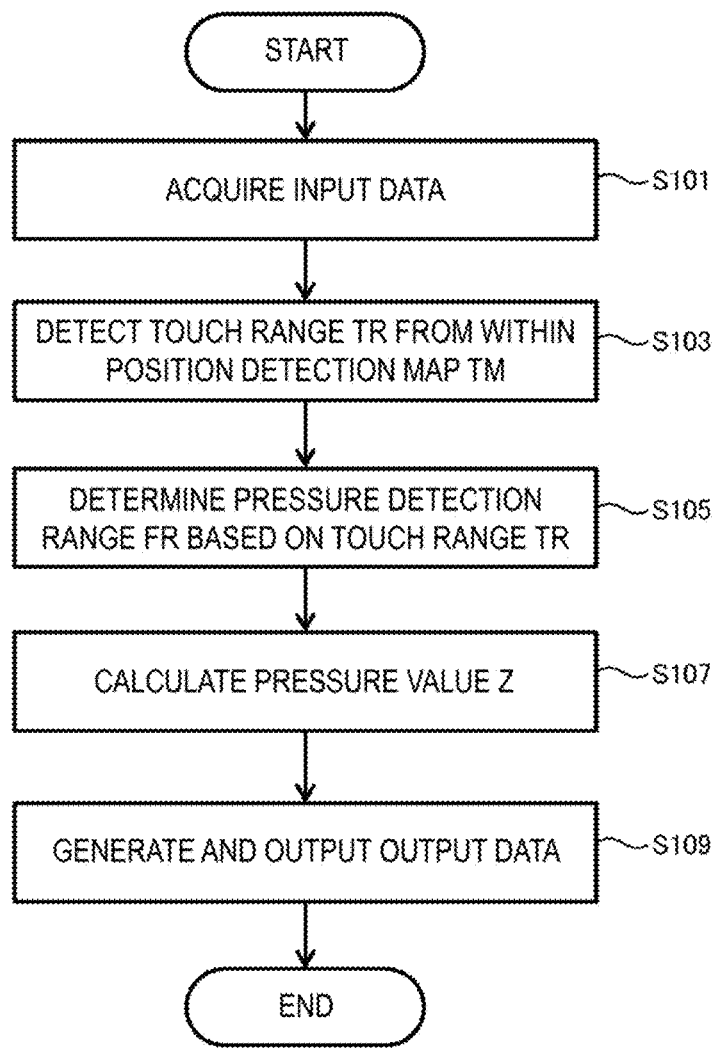
FIG. 10 is a flowchart illustrating an example of a flow of a detection method of the touch panel system according to a first embodiment.
Figure 11:
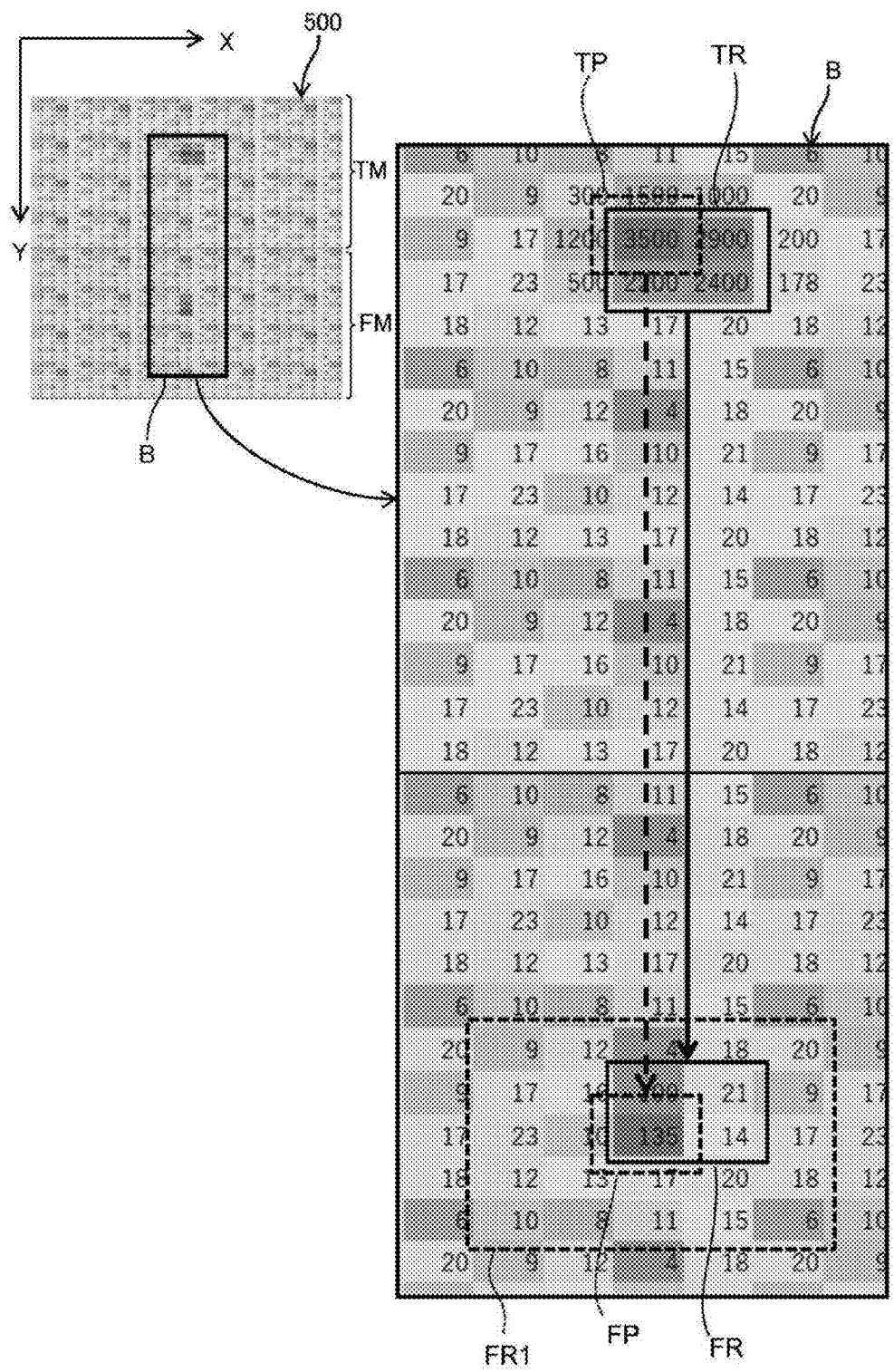
FIG. 11 is a schematic view illustrating an example of a configuration of input data processed by a controller of the touch panel system.

FIG. 10 is a flowchart illustrating an example of a flow of a detection method of the touch panel system S according to a first embodiment. The detection method illustrated in FIG. 10 is implemented by the processor 21 of the controller 2 executing the detection processing 211 in accordance with the program 221, and is a detection method installed in the controller 2. FIG. 11 is a schematic view illustrating an example of a configuration of input data 500 to be processed by the controller 2, and includes an enlarged view of a section B of the input data 500.

First, the controller 2 acquires the input data 500 (step S101). At step S101, the controller 2 imparts a drive signal to the drive electrode 111 and acquires signals from each of the position detection electrode 121 and the pressure detection electrode 122 to acquire the input data 500.

The input data 500 is data including elements represented by the two dimensional coordinates of X and Y, which represent the X direction that is the direction in which the drive electrodes 111 are aligned and the Y direction that is the direction in which the position detection electrodes 121 and the pressure detection electrodes 122 are aligned. Further, the input data 500 is data obtained by arranging the signal values obtained from the position detection electrodes 121 and the pressure detection electrodes 122, respectively, in different regions of a single two-dimensional coordinate system, and combining them together. In the following description, a direction in which the value of Y increases will be expressed as a downward direction, and a direction in which the value of Y decreases will be expressed as an upward direction.

The input data 500 illustrated in FIG. 11 is data obtained when the number of drive electrodes 111 is 25, and the number of position detection electrodes 121 and the number of pressure detection electrodes 122 are both 20. Specifically, in the input data 500 illustrated in FIG. 11, a position detection map (first map) TM in which the signal values obtained from the position detection electrodes 121 are arranged, and a pressure detection map (second map) FM in which the signal values obtained from the pressure detection electrodes 122 are arranged are placed in different regions so that the position detection map TM is disposed upward from the pressure detection map FM. As illustrated in FIGS. 3 and 4, the position detection electrodes 121 and the pressure detection electrodes 122 are alternately arranged, but in the input data 500, the signal values obtained from the respective electrodes are separated. In the input data 500 illustrated in FIG. 11, a signal value corresponding to the electrostatic capacitance formed by the X-th drive electrode 111 and the Y-th position detection electrode 121, while using a chosen corner on the touch panel 1 as the origin, is an element of (X, Y). On the other hand, a signal value corresponding to the electrostatic capacitance formed by the X-th drive electrode 111 and the Y-th pressure detection electrode 122 is an element of (X, Y+20).

The controller 2 detects a touch range TR indicating the range with which the pointer F has come into contact, from within the position detection map TM of the input data 500 (step S103). At step S103, the controller 2 detects, as the touch range TR, a range in which the signal value is equal to or greater than a predetermined threshold value among the elements in the position detection map TM. In the example illustrated in FIG. 11, the threshold value is set to 2000, and a range in which the signal value is equal to or greater than 2000 is detected as the touch range TR.

The controller 2 determines a pressure detection range FR corresponding to the touch range TR, in the pressure detection map FM of the input data 500 (step S105). Here, the pressure detection range FR indicates a range of electrodes that obtain the signal values used for calculating a pressure value Z, which is the magnitude of the pressure applied by the pointer F.

At step S105, as an example, the controller 2 determines, as the pressure detection range FR, a range obtained by moving the touch range TR by a predetermined amount. In the example illustrated in FIG. 11, the controller 2 determines, as the pressure detection range FR, a range obtained by fixing the touch range TR in the X direction, and moving the touch range TR downward in the Y direction by 20, namely, adding 20 to the Y coordinate of the touch range TR.

The controller 2 calculates the pressure value Z based on the signal values in the pressure detection range FR (step S107). Then, the controller 2 generates and outputs output data including at least the pressure value Z (step S109).

In the example illustrated in FIG. 11, at step S107, as an example, the controller 2 adds up the absolute values of the signal values within the pressure detection range FR, to obtain the pressure value Z using the following equation.

$$Z = 100 + 21 + 135 + 14 = 270$$

Second Embodiment

Figure 12:
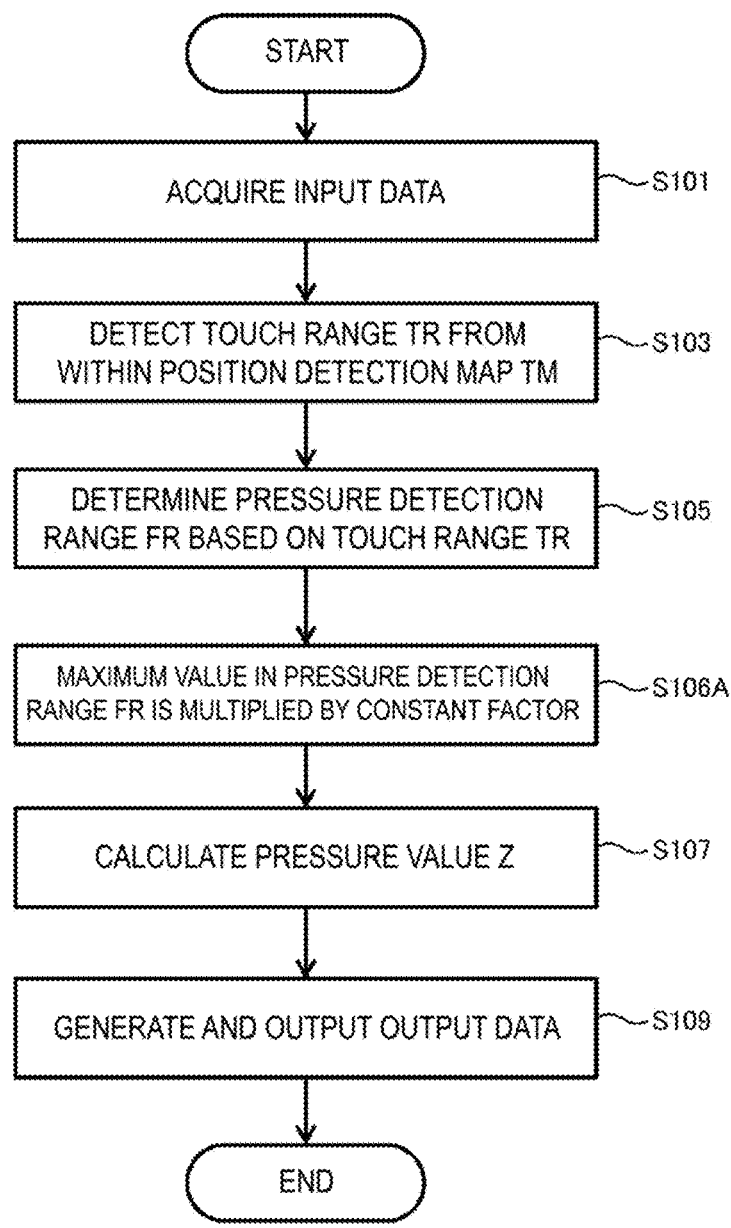
FIG. 12 is a flowchart illustrating an example of a flow of a detection method of the touch panel system according to a second embodiment.

Preferably, when calculating the pressure value Z, the signal values within the pressure detection range FR are set as provisional values, and at least one of the provisional values is amplified (boost processing is performed thereon). FIG. 12 is a flowchart illustrating an example of a flow of a detection method of the touch panel system S according to a second embodiment. The detection method according to the second embodiment is different from the detection method according to the first embodiment illustrated in FIG. 10 in that step S106A is further included in the detection method according to the second embodiment.

Specifically, in the detection method according to the second embodiment, when the pressure detection range FR is determined at step S105, the controller 2 sets all the signal values within the pressure detection range FR as the provisional values, and amplifies the maximum value among the provisional values (step S106A). As an example, the amplification is performed using a predetermined constant factor, and the predetermined constant factor is, for example, 10. In the example illustrated in FIG. 11, 135 among the signal values 100, 21, 135, and 14 within the pressure detection range FR is multiplied by 10.

In the detection method according to the second embodiment, the controller 2 calculates a pressure value Z2 based on the signal values, within the pressure detection range FR, that has been subjected to the amplification at step S106A (step S107). At step S107, as an example, the controller 2 adds up the absolute values of the amplified signal values within the pressure detection range FR to calculate the pressure value Z2. In the example illustrated in FIG. 11, the signal values 100, 21, 1350, and 14 are added up, and the pressure value Z2 is obtained by the following equation.

$$Z2 = 100 + 21 + 1350 + 14 = 1485$$

Third Embodiment

Figure 13:
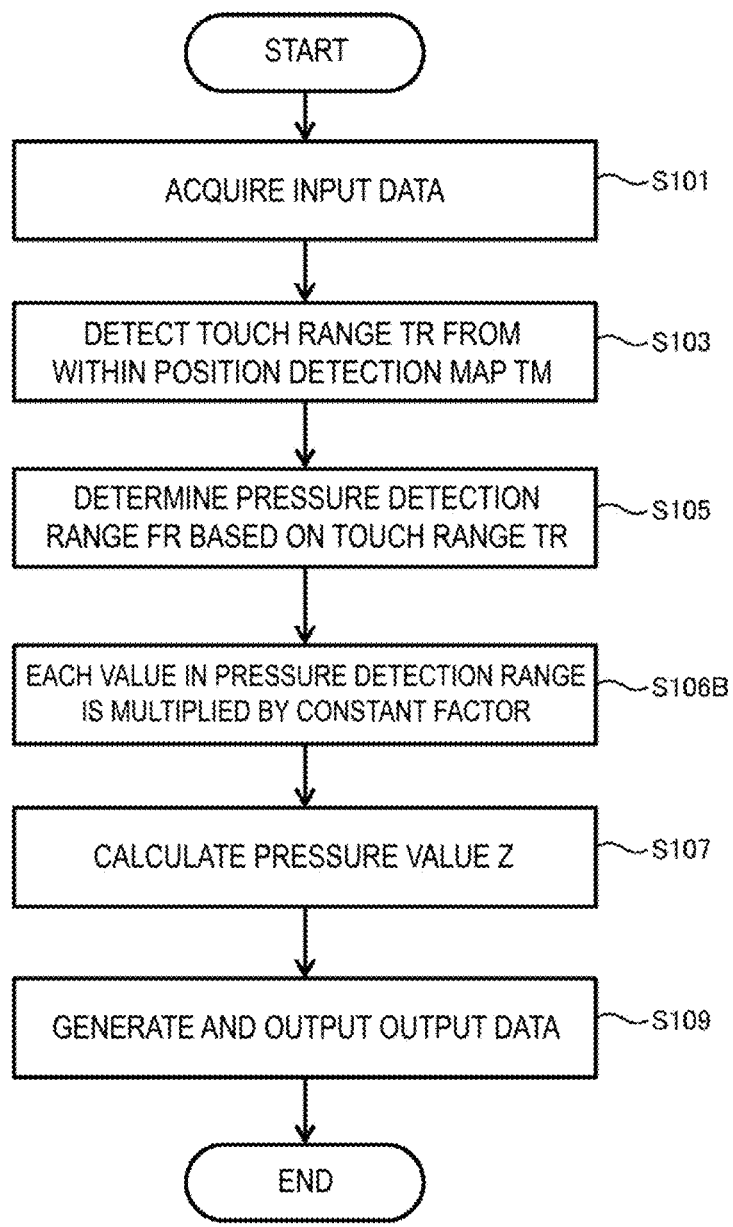
FIG. 13 is a flowchart illustrating an example of a flow of a detection method of the touch panel system according to a third embodiment.

Note that, as another example of the boost processing, all the provisional values within the pressure detection range may be amplified. FIG. 13 is a flowchart illustrating an example of a flow of a detection method of the touch panel system S according to a third embodiment. The detection method according to the third embodiment is different from the detection method according to the first embodiment illustrated in FIG. 10 in that step S106B is further included in the detection method according to the third embodiment.

Specifically, in the detection method according to the third embodiment, when the pressure detection range FR is determined at step S105, the controller 2 sets all the signal values in the pressure detection range FR as the provisional values, and amplifies all the provisional values (Step S106B). As an example, the amplification is performed using a predetermined constant factor, and the predetermined constant factor is, for example, 10. In the example illustrated in FIG. 11, each of the signal values 100, 21, 135, and 14 within the pressure detection range FR is multiplied by 10.

In the detection method according to the third embodiment, the controller 2 calculates a pressure value Z3 based on the signal values, within the pressure detection range FR, that has been subjected to the amplification at step S106B (step S107). In the example illustrated in FIG. 11, at step S107, as an example, the controller 2 adds up the absolute values of the amplified signal values within the pressure detection range FR, and obtains the pressure value Z3 by the following equation.

$$Z3 = 1000 + 210 + 1350 + 140 = 2700$$

Effects of Embodiments

In the touch panel system S, the pressure detection range FR is determined using the touch range TR obtained from the signals from the position detection electrodes 121, and the pressure value Z is calculated from the pressure detection range FR. In other words, in the touch panel system S, the signal values from the pressure detection electrodes 122 in the range corresponding to the contact area (touch range) by the pointer F are used for the calculation of the pressure value Z. Therefore, when the contact area is large, the pressure detection range FR becomes large, and even when the pressure is dispersed, the pressure value Z is calculated using those signal values. Further, when the contact area is small, the pressure detection range FR becomes small, and the noise due to the signal values from the pressure detection electrodes 122 in the range not pressed by the pointer F is suppressed. As a result, the pressure value Z is obtained with a higher degree of accuracy, compared with when using the pressure detection range FR defined based on the operation position by the pointer F.

Figure 14:
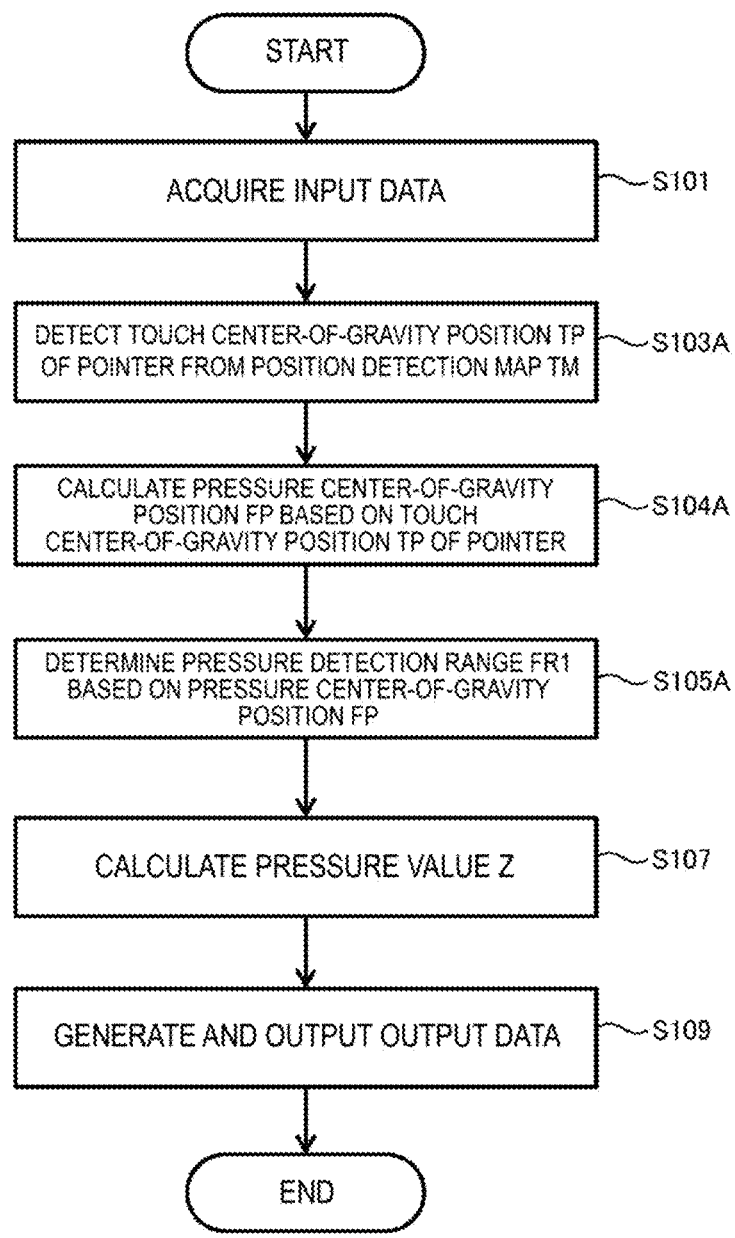
FIG. 14 is a flowchart illustrating an example of a flow of a detection method of the touch panel system according to a comparative example.

FIG. 14 is a flowchart illustrating an example of a flow of a detection method in the touch panel system according to a comparative example. The detection method according to the comparative example illustrated in FIG. 14 is different from the detection method according to the first embodiment illustrated in FIG. 10 in that steps S103 and S105 are different (steps S103A and S105A), and the detection method includes step S104A in the detection method according to the comparative example.

Specifically, in the detection method according to the comparative example, a touch center-of-gravity position TP, which is a center-of-gravity position of the range touched by the pointer F, is detected from within the position detection map TM of the input data 500 (step S103A). At step S103A, as an example, the controller 2 detects, as the touch center-of-gravity position TP, an element that has a signal value equal to or greater than a predetermined threshold value and is the largest in the position detection map TM among the elements in the position detection map TM. In the example illustrated in FIG. 11, the position of the signal value (3500) is detected as the touch center-of-gravity position TP.

Next, in the pressure detection map FM of the input data 500, a pressure center-of-gravity position FP corresponding to the touch center-of-gravity position TP is calculated (step S104A). As an example, a position obtained by moving the touch center-of-gravity position TP by a predetermined amount is determined to be the pressure center-of-gravity position FP. In the example illustrated in FIG. 11, the X direction of the pressure center-of-gravity position FP is fixed and the Y direction is moved downward by 20. In other words, a position obtained by adding 20 to the Y coordinate of the touch center-of-gravity position TP is determined to be the pressure center-of-gravity position FP.

In the detection method according to the comparative example, a pressure detection range FR1 is determined around the pressure center-of-gravity position FP in the pressure detection map FM of the input data 500 (step S105A). In the example illustrated in FIG. 11, a 5×5 region centered around the pressure center-of-gravity position FP is determined to be the pressure detection range FR1.

When the pressure detection range FR1 determined by the detection method according to the comparative example is compared with the pressure detection range FR determined by the detection method according to the first embodiment (FIG. 11), the pressure detection range FR1 is larger than the pressure detection range FR corresponding to the actual pressure range. Thus, by using the detection by the detection method according to the first embodiment, the pressure value Z is calculated while suppressing the noise due to the signal values from the pressure detection electrodes 122 arranged at positions that is not in contact with the pointer. In other words, the pressure value Z is calculated with a higher degree of accuracy than when the detection method illustrated in FIG. 14 is used.

In the example illustrated in FIG. 11, a pressure value Z1=555 was obtained from the pressure detection range FR1, and the pressure value Z=270 was obtained from the pressure detection range FR. The influence from the noise in each of those cases is represented by the sum (EU25) of the signal values (for example, signal values equal to and less than 25) from the pressure detection electrodes 122 at the positions that is not in contact with the pointer F, and is represented by index values I1 and I2, respectively, which are each a ratio of EU25 with respect to the pressure value. The index value I1=58 [%] in the detection method according to the comparative example and the index value I2=13 [%] in the detection method according to the first embodiment were obtained by the following equations, respectively. Therefore, it was verified that the pressure value by the pointer F was accurately calculated by the detection method according to the first embodiment.

$$I1 = \left(\sum U25/Z1\right) \times 100 = 58 \ [\%]$$

$$I2 = \left(\sum U25/Z\right) \times 100 = 13 \ [\%]$$

Further, in the touch panel system S according to the second embodiment, the boost processing is performed, and the signal value most strongly representing the influence of the pressure by the pointer F is amplified. Thus, it is possible to reduce the influence of the noise due to the signal values from the pressure detection electrodes 122 at the positions that is not in contact with the pointer F, and to obtain the pressure value with a higher degree of accuracy.

In the example illustrated in FIG. 11, an index value I3 in the detection method according to the second embodiment was calculated to be 2%. Thus, it was verified that the pressure value by the pointer F was calculated with a higher degree of accuracy by the detection method according to the second embodiment.

Here, the pressure value obtained by performing the boost processing on the pressure detection range detected by the detection method in the touch panel system S according to the second embodiment is compared with the pressure value obtained by performing the boost processing on the pressure range obtained by the detection method according to the comparative example. FIGS. 15A, 15B and 16A, 16B are diagrams for describing the pressure detection range determined by the detection method in the touch panel system S according to the second embodiment, when the contact area by the pointer F on the touch panel 1 is small and when the contact area by the pointer F on the touch panel 1 is large, respectively. In FIGS. 15A, 15B and 16A, 16B, the input data shown in FIGS. 8A, 8B and 9A, 9B are used.

Figure 15A:
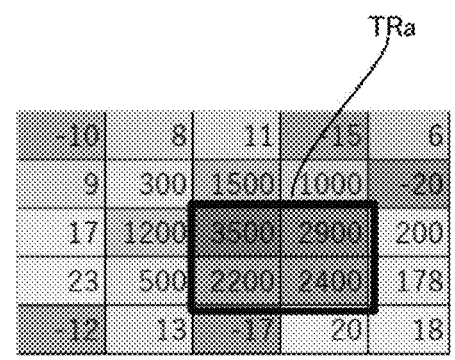
FIGS. 15A and 15B are diagrams for describing a pressure detection range determined by the detection method of the touch panel system according to the embodiment, when the contact area by the pointer on the touch panel is small.
Figure 16A:
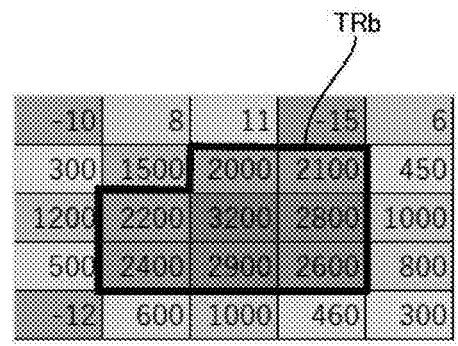
FIGS. 16A and 16B are diagrams for describing the pressure detection range determined by the detection method of the touch panel system according to the embodiment, when the contact area by the pointer on the touch panel is large.

In this example, based on the input data of the signal values from the position detection electrodes 121 in FIG. 15A and FIG. 16A, assuming that the threshold value is 2000, touch ranges TRa and TRb that are ranges in which the signal values are equal to or greater than 2000 are detected.

Figure 15B:
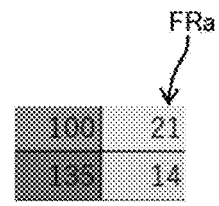
Figure 16B:
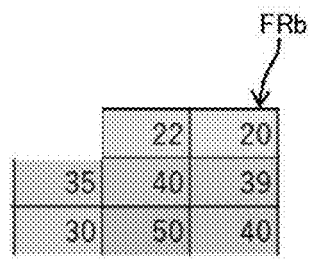

In the detection method according to the second embodiment, pressure detection ranges FRa and FRb corresponding to the touch ranges TRa and TRb are determined based on the input data of the signal values from each of the pressure detection electrodes 122 shown in FIG. 15A and FIG. 16A (FIG. 15B and FIG. 16B).

When the boost processing according to the second embodiment is performed, pressure values Z4 and Z5 are obtained from the pressure detection ranges FRa and FRb by the following equations, respectively.

$$Z4 = 100 + 21 + 135 \times 10 + 14 = 1485$$

$$Z5 = 22 + 20 + 35 + 40 + 39 + 30 + 50 \times 10 + 40 = 726$$

On the other hand, as a comparative example, pressure values Z6 and Z7 are calculated in the same manner with respect to the pressure range defined according to the operation position of the pointer F, which is described above with reference to FIGS. 8A, 8B, 9A, and 9B. In the detection method according to the comparative example, as an example, based on the input data of the signal values from the position detection electrodes 121, a position at which the signal value is the largest is set as the operation position, and based on the input data of the signal values from the pressure detection electrodes 122, a defined range from the position corresponding to the operation position is determined to be the pressure range. In the example illustrated in FIGS. 8A and 8B, the position of the signal value 3500 in FIG. 8A is determined to be the operation position, and a 5×5 range centered around the signal value 100 in FIG. 8B corresponding to the operation position is determined to be the pressure range.

In the example illustrated in FIGS. 8A and 8B, the pressure range obtained by the detection method according to the comparative example coincides with the pressure range illustrated in FIG. 8B. In the example illustrated in FIGS. 9A and 9B, the position of the signal value 3200 in FIG. 9A is determined to be the operation position, and the pressure range obtained by the detection method according to the comparative example coincides with the pressure range illustrated in FIG. 9B.

When the same boost processing as the boost processing according to the second embodiment is performed, the pressure values Z6 and Z7 are obtained from the pressure range illustrated in FIG. 9B and the pressure range illustrated in FIG. 8B determined by the detection method according to the comparative example, by the following expressions, respectively.

$$Z6 = 10 + 8 + 11 + 15 + 6 + 9 + 12 + 4 + 18 + 20 + 17 + 16 + 100 + 21 +$$
$$9 + 23 + 10 + 135 \times 10 + 14 + 17 + 12 + 13 + 17 + 20 + 18 = 1770$$

$$Z7 = 10 + 8 + 11 + 15 + 6 + 9 + 15 + 22 + 20 + 20 + 17 + 35 + 40 +$$
$$39 + 9 + 23 + 30 + 50 \times 10 + 40 + 17 + 12 + 13 + 25 + 20 + 18 = 974$$

In the detection method according to the comparative example, while assuming that the pressure value Z6 obtained when the contact area was small was 100%, a ratio R1 of the pressure value Z7 obtained when the contact area was large was calculated by the following equation. This ratio corresponds to a ratio of the pressure values that are converted such that the contact areas are identical to each other.

$$R1 = (Z7 \div Z6) \times 100 = (974 \div 1770) \times 100 = 55 \ [\%]$$

Similarly, with respect to the pressure values Z4 and Z5 calculated by performing the boost processing on the pressure detection ranges FRa and FRb obtained by the detection method according to the second embodiment, while assuming that the pressure value Z4 obtained when the contact area was small was 100%, a ratio R2 of the pressure value Z5 obtained when the contact area was large was calculated by the following equation.

$$R2 = (Z5 \times (8/4) \div Z4) \times 100 = (726 \times (8/4) \div 1485) \times 100 = 98 \ [\%]$$

The fact that the ratio R1 is 55 [%] indicates that when the boost processing is performed on the pressure range obtained by the detection method according to the comparative example, a decrease in the signal value from the pressure detection electrode 122 notably occurs due to dependency on the contact area. On the other hand, the fact that the ratio R2 is 98 [%] indicates that when the boost processing is performed on the pressure detection range obtained by the detection method according to the embodiment, that is, when the pressure values Z4 and Z5 are calculated by the detection method according to the second embodiment, the decrease in the signal value from the pressure detection electrode 122 due to the dependency on the contact area is alleviated. Therefore, it was verified that the decrease in the signal value from the pressure detection electrode 122 due to the dependency on the contact area is significantly alleviated by calculating the pressure value by the detection method according to the second embodiment.

Note that the disclosure is not limited to the above-mentioned embodiments, and various modifications can be implemented. Further, the touch panel system and the display device according to an embodiment can also be described as follows.

(1) A touch panel system according to an embodiment includes a touch panel including a drive electrode, a position detection electrode, and a pressure detection electrode, and a controller configured to impart a drive signal to the drive electrode, and acquire a signal value from each of the position detection electrode and the pressure detection electrode. The controller is configured to perform detecting, based on the signal value obtained from the position detection electrode, a touch range by a pointer, determining a pressure detection range corresponding to the touch range, of the signal value obtained from the pressure detection electrode, and calculating, based on the signal value in the pressure detection range, a magnitude of a pressure applied by the pointer.

With this configuration, in the touch panel system, the signal value from the pressure detection range corresponding to the touch range by the pointer is used for the calculation of the magnitude of the pressure. Therefore, when the touch range is large, the pressure detection range becomes large, and even when the pressure is dispersed, the magnitude of the pressure is calculated using the signal value. Further, when the touch range is small, the pressure detection range becomes small, and noise due to the signal value from the pressure detection electrode in a range not pressed by the pointer is suppressed. Therefore, an influence by the contact area on the touch panel is suppressed, and the magnitude of the pressure can be accurately calculated. This was verified by the inventors performing a comparison with the magnitude of the pressure calculated using the signal value in the pressure detection range defined based on an operation position by the pointer.

(2) In the touch panel system according to (1), the detecting the touch range preferably includes detecting the touch range based on the signal value from a first map constituted by the signal value obtained from the position detection electrode, and the determining the pressure detection range preferably includes determining, as the pressure detection range, a range corresponding to a position of the touch range, of a second map constituted by the signal value obtained from the pressure detection electrode. By using the first map and the second map, the pressure detection range can be easily determined.

(3) In the touch panel system according to (2), the calculating the magnitude of the pressure preferably includes amplifying a provisional value based on at least one of the signal values in the pressure detection range. In this way, a decrease in the signal value in the pressure detection range due to dependency on the contact area is alleviated. As a result, the magnitude of the pressure can be calculated with a higher degree of accuracy. The fact that the decrease in the signal value in the pressure detection range due to the dependency on the contact area was significantly alleviated was verified by the inventors performing a like-to-like comparison with respect to the pressure detection range defined based on the operation position by the pointer.

(4) In the touch panel system according to (3), the calculating the magnitude of the pressure preferably includes amplifying a maximum value among all the provisional values based on all the signal values in the pressure detection range.

(5) In the touch panel system according to (3), the calculating the magnitude of the pressure preferably includes amplifying all the provisional values based on all the signal values in the pressure detection range.

(6) A display device according to an embodiment includes the touch panel system according to any one of (1) to (5), and a display unit configured to display an image. The touch panel is disposed on a display surface on which the display unit displays an image. With this configuration, the display device can obtain, from the touch panel system, an accurately calculated magnitude of the pressure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A touch panel system comprising:
a touch panel including a drive electrode, a position detection electrode, and a pressure detection electrode; and
a controller configured to impart a drive signal to the drive electrode, and acquire a signal value from each of the position detection electrode and the pressure detection electrode, wherein
the controller is further configured to:
detect, based on the signal value obtained from the position detection electrode, a touch range by a pointer,
determine a pressure detection range, corresponding to the touch range, of the signal value obtained from the pressure detection electrode, and
calculate, based on at least one signal value in the pressure detection range, a magnitude of a pressure applied by the pointer,
wherein calculating the magnitude of the pressure comprises amplifying at least one provisional value, based on the at least one signal value in the pressure detection range, by an equation that does not use any signal value from the position detection electrode.

2. The touch panel system according to claim 1, wherein detecting the touch range comprises detecting the touch range based on a signal value from a first map formed by the signal value obtained from the position detection electrode, and
determining the pressure detection range comprises determining, as the pressure detection range, a range corresponding to a position of the touch range, of a second map formed by the signal value obtained from the pressure detection electrode.

3. The touch panel system according to claim 1, wherein calculating the magnitude of the pressure comprises amplifying a maximum value among all provisional values based on all signal values in the pressure detection range.

4. The touch panel system according to claim 1, wherein calculating the magnitude of the pressure comprises amplifying all provisional values based on all the signal values in the pressure detection range.

5. A display device comprising:
the touch panel system according to claim 1; and
a display unit configured to display an image,
wherein the touch panel is disposed on a display surface on which the display unit displays the image.

* * * * *